Figure 1:
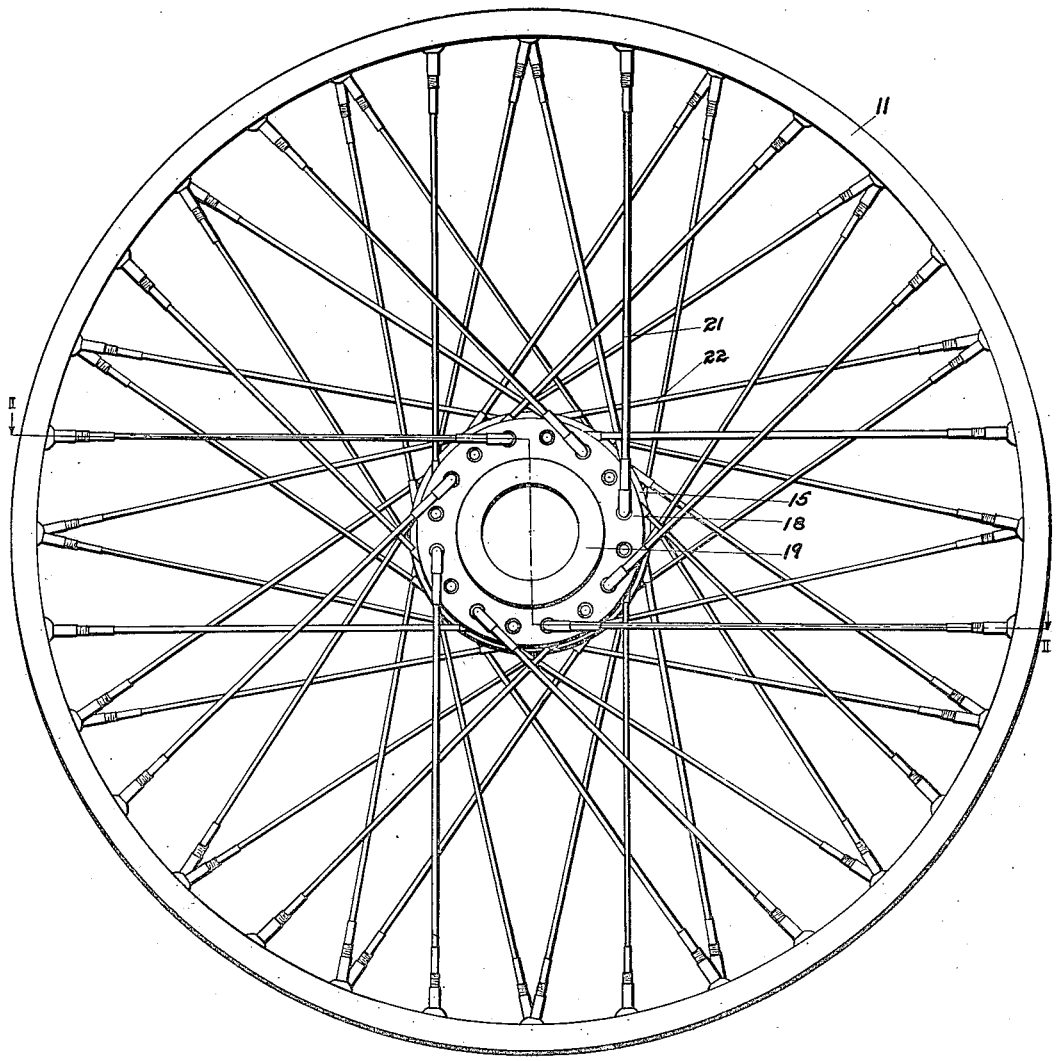

C. SCHENCK AND L. FINE.
WHEEL.
APPLICATION FILED OCT. 17, 1918.

1,418,331.

Patented June 6, 1922.
2 SHEETS—SHEET 1.

INVENTORS
Charles Schenck
Lewis Fine
BY
ATTORNEY

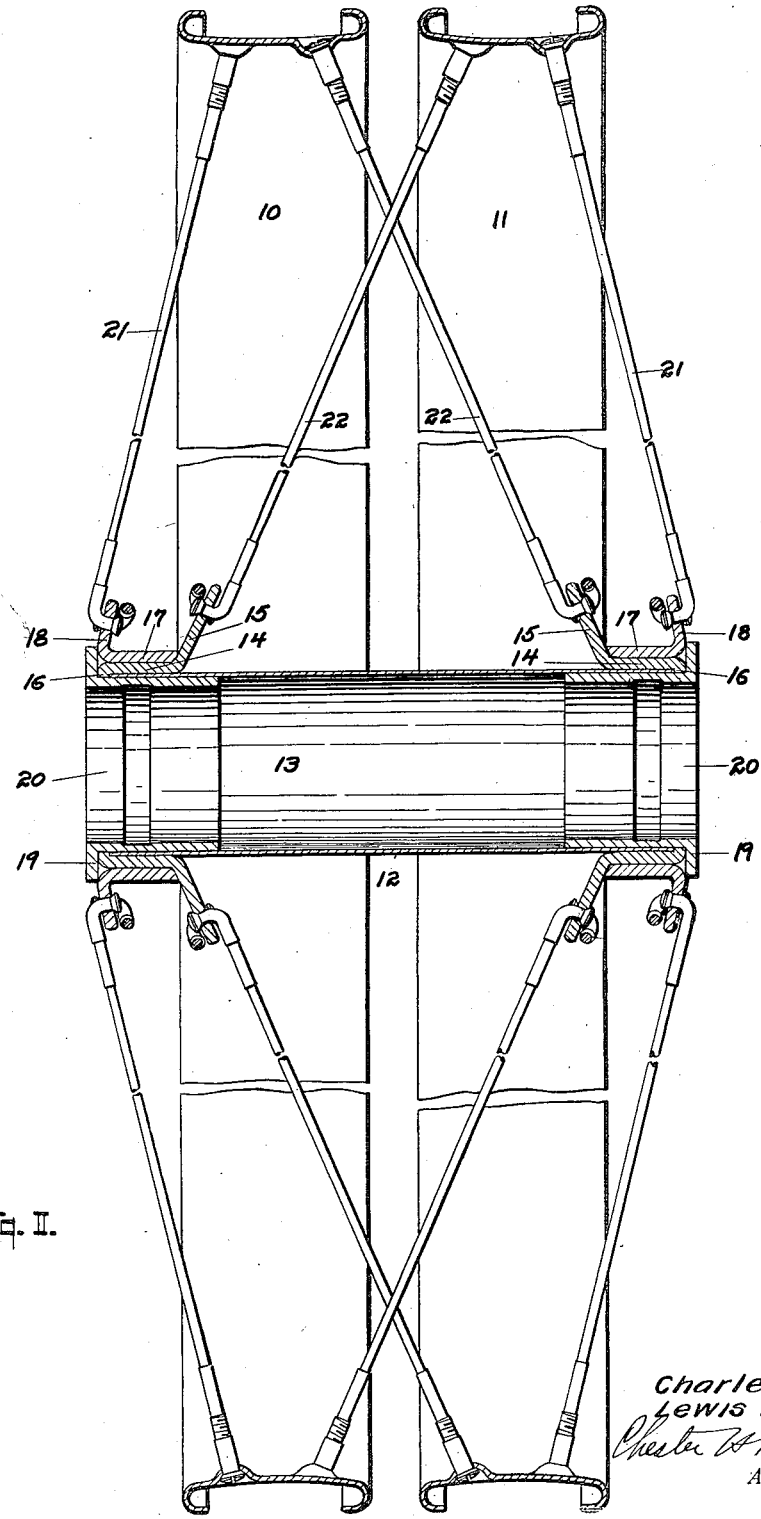

UNITED STATES PATENT OFFICE.

CHARLES SCHENCK AND LEWIS FINE, OF PHILADELPHIA, PENNSYLVANIA, ASSIGNORS, BY MESNE ASSIGNMENTS, TO BUDD WHEEL COMPANY, OF PHILADELPHIA, PENNSYLVANIA, A CORPORATION OF PENNSYLVANIA.

WHEEL.

1,418,331.               Specification of Letters Patent.      Patented June 6, 1922.

Application filed October 17, 1918. Serial No. 258,500.

*To all whom it may concern:*

Be it known that we, CHARLES SCHENCK and LEWIS FINE, citizens of the United States, residing at Philadelphia, in the county of Philadelphia and State of Pennsylvania, have invented certain new and useful Improvements in Wheels, of which we declare the following to be a full, clear, and exact description.

This invention relates to improvements in wheels, and particularly to twin wire wheels, for vehicles and the like. One of the objects of the invention is to provide an improved hub structure for vehicle wheels, comprising few parts, which can be manufactured, assembled and connected with the wheel rims at a relatively low cost.

A further object of the invention is to provide a wire wheel having a built-up hub structure, the parts of which are held in proper position, one by another.

Still another object of the invention is to provide a wire wheel having an improved and novel spoke arrangement, affording a strong and rigid bracing and tying structure between the hub and the rims of the wheel.

Further objects, and objects relating to economies of manufacture and details of construction, will definitely appear from the detailed description to follow.

We accomplish the objects of our invention by the devices and means described in the following specifications. Our invention is clearly defined and pointed out in the appended claims.

A structure constituting a preferred embodiment of our invention is illustrated in the accompanying drawings, forming a part of this specification, in which:

Figure I is a side elevation of a wheel embodying the preferred form of the invention, and Figure II is a sectional view taken on line II—II of Figure I.

In the drawings, similar reference numerals refer to similar parts throughout the several views.

Referring to the drawings, 10 and 11 represent the rims of the wheel, which may be of any suitable or preferred type. Centrally of the rims is mounted the hub 12 comprising a sleeve 13, surrounding the outer ends of which are the inner rings 14 carrying the inwardly directed annular flanges 15. The rings 14 are provided on their outer ends with inwardly projecting flanges or shoulders 16, which are adapted to seat on the opposite ends of the sleeve to prevent inward displacement of said rings upon the sleeve. The outer rings 17 are inserted upon the rings 14 with their inner edges abutting the flanges 15, as shown in Figure II. The outer rings are provided with the annular flanges 18 which preferably are inclined inwardly, and said outer rings are held upon the inner rings by the flange 19 of the bearing member 20, which is tightly driven or forced into the sleeve 13 to receive and support the axle bearings (not shown). The flanges 19 of said bearing members also serve to hold the inner rings 14 in position upon the sleeve 13. The flanges 18 of the outer rings 17 are adapted to receive the inner ends of the spokes 21, the outer ends of said spokes being connected with the wheel rims preferably adjacent the outer edges thereof. The spokes 22 have their outer ends connected to the rims adjacent their inner edges, while the inner ends of said spokes are connected to the flanges 15 of the inner rings 14. The spokes 22 are therefore crossed and are adapted to connect each end of the hub with the rim farthest therefrom, while the spokes 21 connect each end of the hub with the rim nearest thereto. It will be seen, therefore, that each rim is tied to both ends of the hub, and by this means a very strong and well balanced wheel is afforded.

Having thus described our invention, what we claim as new and desire to secure by Letters Patent, is:—

1. In combination, a wheel comprising a pair of rims, a hub, an inner flanged member adjacent each end of the hub, an outer flanged member mounted on each inner flanged member, spokes connecting each of the inner flanged members with the rim farthest therefrom, and spokes connecting each of the outer flanged members with the rim nearest thereto.

2. In combination, a wheel comprising a pair of rims, a hub having an inner and outer flanged member at each end thereof, said outer flanged members being mounted on and held against inward movement by said inner flanged members, and a plurality of spokes connecting said flanged members with said rims.

3. In combination, a wheel comprising a pair of rims, a hub sleeve, an inner flanged ring seated upon each end of the sleeve, an outer flanged ring carried by each of said inner flanged rings, a plurality of spokes connecting the inner flanged rings with the rims farthest therefrom, and a plurality of spokes connecting the outer flanged rings with the rims nearest thereto.

4. In combination, a wheel comprising a pair of rims, a hub sleeve, an inner flanged ring seated upon each end of the sleeve, an outer flanged ring carried by each of said inner flanged rings, a plurality of spokes connecting the inner flanged rings with the rims farthest therefrom, a plurality of spokes connecting the outer flanged rings with the rims nearest thereto, and a bearing member projecting into each end of the sleeve and engaging said rings to prevent outward displacement thereof.

5. In combination, a wheel having a plurality of rims, a hub comprising a sleeve, an inner flanged ring seated upon each end of the sleeve and adapted to be held against inward movement thereby, an outer flanged ring mounted upon each of the inner flanged rings and abutting the flange of the latter, a bearing member, projecting into each end of said sleeve and having a flange engaging the adjacent rings to prevent outward displacement thereof and spokes connecting said rings with the rims of said wheel.

6. In a wheel, the combination of a cylindrical hub, an inner sleeve mounted on each end of said hub and having an annular spoke-anchoring flange on its inner end, and an outer sleeve mounted on each inner sleeve and having an annular spoke-anchoring flange on its outer end.

7. In a wheel structure, the combination of an inner tubular hub, and two outer hubs mounted in axial alinement on said inner hub, each of said outer hubs comprising two tubular members telescoping on each other, and each of said members being provided with an outwardly extending flange.

In testimony whereof, we affix our signatures.

CHARLES SCHENCK.
LEWIS FINE.